March 26, 1935. O. G. SIMMONS 1,995,327
METHOD FOR GENERATING WORM WHEELS
Filed Aug. 15, 1930 3 Sheets-Sheet 1

INVENTOR
Oliver Simmons

March 26, 1935.  O. G. SIMMONS  1,995,327

METHOD FOR GENERATING WORM WHEELS

Filed Aug. 15, 1930  3 Sheets-Sheet 3

INVENTOR

Patented Mar. 26, 1935

1,995,327

UNITED STATES PATENT OFFICE 1,995,327

METHOD FOR GENERATING WORM WHEELS

Oliver G. Simmons, Lakewood, Ohio, assignor, by mesne assignments, to Dual L. Simmons Application August 15, 1930, Serial No. 475,540

5 Claims. (Cl. 90—9)

The present invention relates to gear shapers and methods of generating gears in such machines and more particularly to the generation of worm wheels and worms by means of gear shaper cutters.

The present invention has for an object to provide a method of generating hollow face worm wheels with a gear shaper cutter.

A further object is to provide a method of generating worms with a gear shaper cutter.

A further object is to provide a gear shaper in which both worms and worm wheels can be generated.

In my copending application, Serial No. 443,185, filed April 10, 1930 now Patent No. 1,968,469, issued July 31, 1934, there is disclosed a universal gear shaper adapted to generate spur gears and helical gears of any desired helix angle.

The present invention consists in certain improvements by means of which the universal gear shaper disclosed in said copending application may be utilized in the manufacture of worm gearing.

With the above and other objects in view, the invention may be said to comprise the apparatus and methods as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Figure 1:
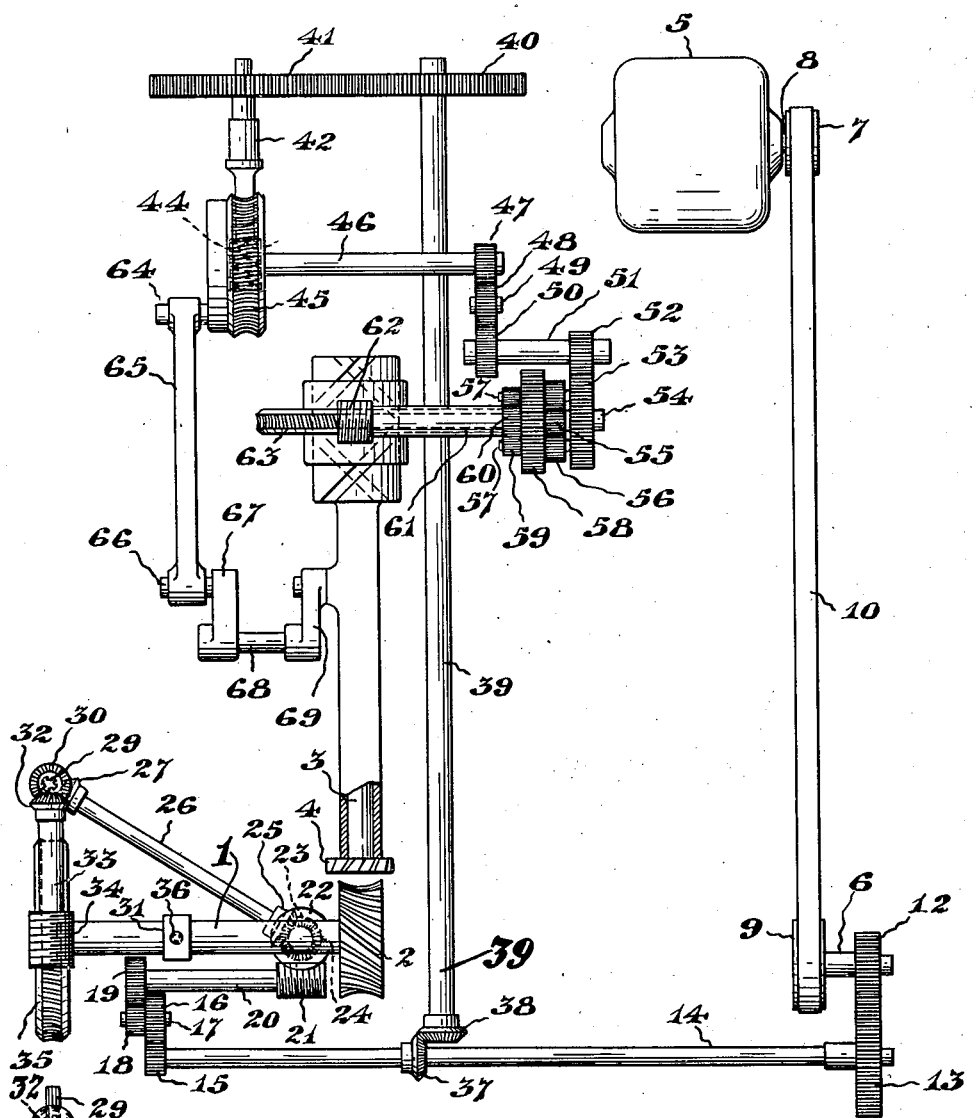
Fig. 1 is a diagrammatic plan view showing the operating mechanism of the gear shaper.

In generating worm wheels by the method of the present invention, the blank is supported with its axis at an angle to the axis of the cutter corresponding substantially to the angle at which the axis of the finished worm wheel crosses the axis of the worm with which it is designed to mesh. Since the axis of a worm wheel is usually disposed at right angles to the axis of the worm, the cutter and blank are shown in the accompanying drawings with their axes disposed at right angles to each other.

As shown in the accompanying drawings, the work spindle 1 carries the worm wheel blank 2 which is positioned directly over the axis of the cutter spindle 3 which has the helical gear shaper cutter 4 attached to its forward end and the worm wheel 2 is generated during the axial reciprocation of the cutter and simultaneous rotation of the cutter and blank, as will hereinafter be explained.

Figure 2:
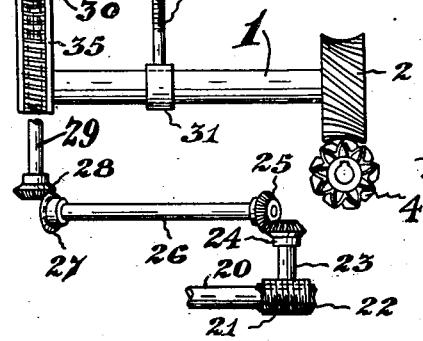
Fig. 2 is a diagrammatic front elevation of the work spindle head and spindle driving means.
Figure 3:
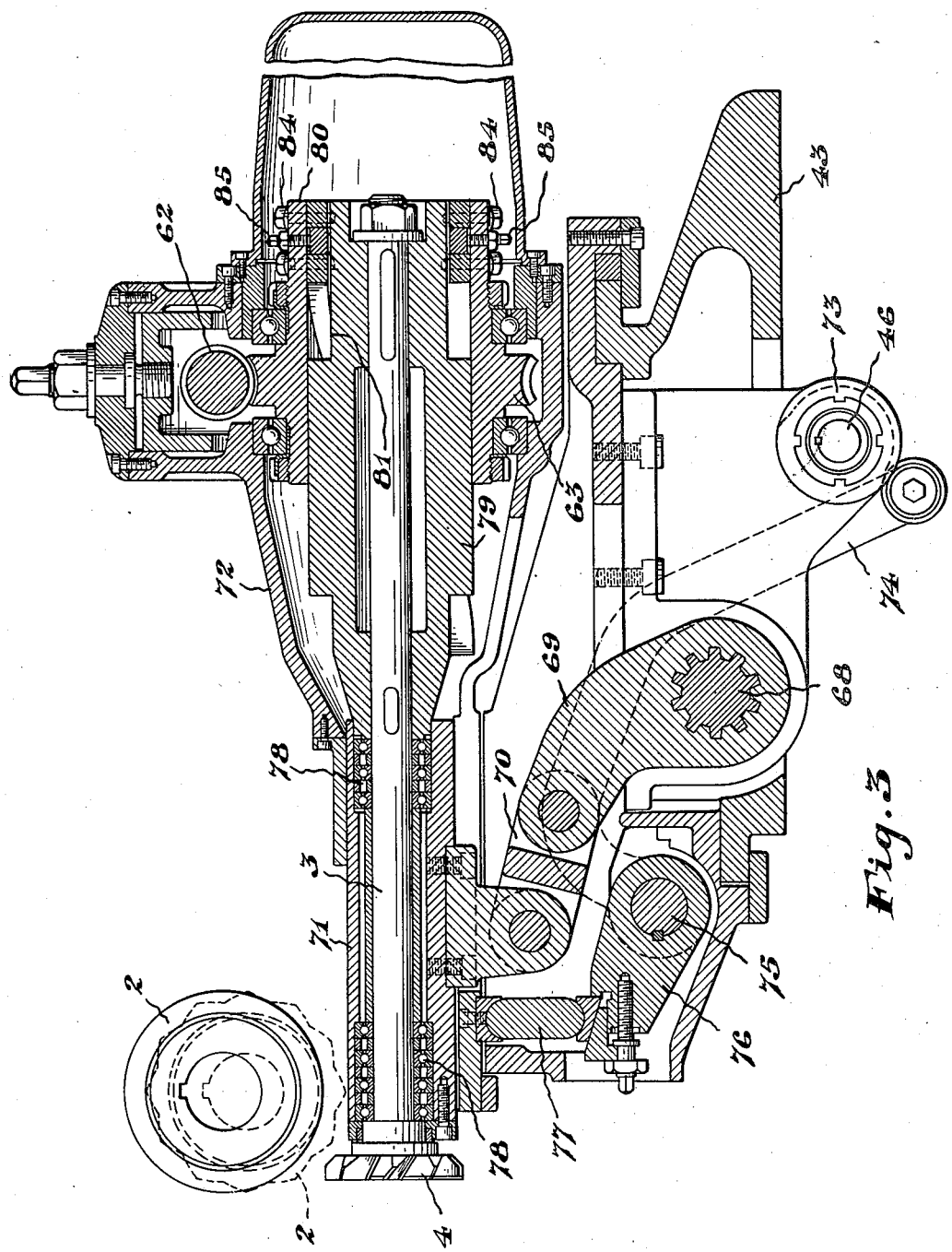
Fig. 3 is a longitudinal vertical section taken axially through the cutter spindle head.
Figure 4:
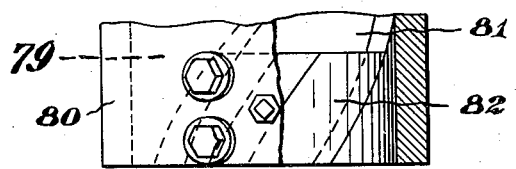
Fig. 4 is a fragmentary top plan view showing the helical groove and gib for oscillating the cutter spindle.

The improvements of the present invention are illustrated as applied to the universal gear shaper disclosed in my copending application above referred to, the operating mechanism being illustrated in Figs. 1, 2 and 3. The entire mechanism is driven by the electric motor 5, which is mounted in the base of the machine adjacent the rear end and which drives the short transverse shaft 6 mounted in the base adjacent the forward end of the machine through a silent chain drive which comprises the sprocket 7 on the motor shaft 8, the sprocket 9 fixed to the shaft 6 and the drive chain 10 extending over the sprockets 7 and 9. The shaft 6 has fixed thereto the spur gear 12 which meshes with the spur gear 13 fixed to the transverse shaft 14 which extends transversely across the base of the machine.

On the end opposite that to which the gear 13 is attached, the shaft 14 has fixed thereto the spur gear 15 which meshes with the spur gear 16 on the adjustable counter shaft 17, which has fixed thereto the second gear 18 meshing with the gear 19 on the transverse shaft 20. The shaft 20 has fixed to the inner end thereof the worm 21 which meshes with the worm gear 22 fixed to the vertical shaft 23, which is located at the axis of the angularly adjustable work spindle carrying turret.

The vertical shaft 23 is mounted in the base of the machine and has fixed thereto the miter gear 24 which meshes with the miter gear 25 fixed to the horizontal shaft 26 which swings with the work spindle supporting turret. The shaft 26 has the miter gear 27 fixed to the outer end thereof which meshes with the miter gear 28 fixed to the lower end of the vertical shaft 29. At the upper end thereof, the shaft 29 has splined thereon the miter gear 30 which is carried by a part of the work spindle carrying head 31. The gear 30 meshes with the miter gear 32 fixed to the end of the horizontal worm shaft 33 mounted in the head 31 and extending across the head at right angles to the work spindle 1. The shaft 33 has fixed thereto the worm 34 which meshes with the worm wheel 35 fixed to the work spindle 1.

The gearing above described provides a driving connection from the motor 5 to the work spindle 1 in any adjustable position of the spindle, the vertical shaft 23 at the axis of the spindle supporting turret providing a drive through the shafts 26, 29 and 33 to the work spindle in any position of angular adjustment thereof and the shaft 29 providing a drive through the spline gear 30 to the shaft 33 in any vertical position of the spindle carrying head 31 which may be adjusted vertically on the turret by means of a suitable adjusting screw 36. The gears 12 and 13 are change gears accessible from the front of the machine and the gears 15, 16, 18 and 19 are change gears accessible from the rear of the machine, all of these gears being readily detachable and replaceable with gears of different sizes to obtain various speed ratios as is well understood in the art.

Intermediate the ends thereof, the transverse shaft 14 has fixed thereto the miter gear 37 which meshes with the miter gear 38 fixed to the forward end of the longitudinal shaft 39, which extends to the rear end of the machine and has fixed to its rear end the spur gear 40 which meshes with the spur gear 41 fixed to the telescopic shaft 42, the gears 40 and 41 being change gears accessible from the rear end of the machine. The forward end of the telescopic shaft 42 is mounted in the longitudinally adjustable support 43 (see Fig. 3) and has fixed thereto the worm 44 which meshes with the worm wheel 45 fixed to the transverse shaft 46 in the support 43.

The shaft 46 has fixed thereto the spur gear 47 which meshes with the spur gear 48 on the short counter-shaft 49 and the gear 48 meshes with the gear 50 on the transverse shaft 51 mounted on the support 43. The shaft 51 has fixed thereto the second gear 52 which meshes with the gear 53 fixed to the transverse shaft 54 and the shaft 54 has fixed thereto the second gear 55 inwardly of the gear 53. The gear 55 is engaged by a plurality of planetary gears 56 which are fixed to the outer ends of the shafts 57 extending through and journalled in the rotary carrier 58, which is in the form of a spur gear and which is rotatably mounted with respect to the shaft 54.

The shafts 57 have planetary gears 59 fixed to the inner ends thereof which are of less diameter than the gears 56 and which mesh with the gear 60 fixed to the tubular shaft 61 rotatably mounted in axial alignment with the shaft 54.

The worm 62 fixed securely to the shaft 61 meshes with the worm wheel 63 in which the rear end of the reciprocable cutter spindle 3 is splined. The planetary gearing is employed for automatically varying the speed of rotation of the cutter spindle during the lateral feed movement of the cutter spindle head.

The methods of the present invention, however, do not require the lateral feed movements of the cutter spindle head and the gear 58 is held against rotation at all times by the gearing with which it is connected, since this gearing is actuated only by the mechanism for imparting lateral feed movement to the cutter spindle.

With the planetary gear carrier 58 held against rotation, the gearing above described rotates the cutter spindle 3 at a speed which bears a fixed ratio to the speed of rotation of the work spindle 1, the change gears 47, 48 and 50, together with the change gears 15, 16, 18 and 19 providing means for varying the speed ratio between the two spindles, as desired to obtain a ratio equal to the ratio between the number of teeth of the cutter and the number of teeth of the worm wheel or worm being generated.

The change gears 40 and 41 provide means for varying the reciprocating speed of the cutter independently of the rotary movement of the cutter and work spindle.

The worm wheel 45 carries the radially adjustable crank pin 64 to which is pivoted the connecting rod 65 which is in turn connected to the crank pin 66 on the arm 67 fixed to the shaft 68 which is journalled in the cutter spindle support.

The crank and connecting rod serve to impart an oscillatory movement to the shaft 68 and the angle of oscillation of the shaft 68 is adjustable by adjusting the crank pin 64. The shaft 68 has splined thereto the arm 69 which is connected by the link 70 (Fig. 3) to the longitudinal slide 71 in which the forward end of the spindle 3 is mounted to impart an axial reciprocating movement to the cutter spindle.

As shown in Fig. 3 of the drawings, the slide 71 is mounted in the forward end of the spindle housing 72, which is supported for limited movement about the axis of the worm 62. The forward stroke of the cutter spindle is the cutting stroke and since the rearward stroke is an idle stroke, means is provided for lifting the forward end of the cutter spindle slightly so that the cutter will clear the work on the return stroke. For tilting the housing 72 to lower the cutter during the return stroke, the cam 73 is mounted on the transverse shaft 46 and this cam actuates the arm 74 fixed to and extending rearwardly from the shaft 75 mounted in the transverse slide portion of the support 43 beneath the forward end of the housing 72. The shaft 75 has fixed thereto the short forwardly extending arm 76 and the thrust link 77 is interposed between the arm 76 and the housing 72. The spindle 3 is journalled in the slide 71 and held against endwise movement with respect thereto by means of the ball bearings 78. The rear end of the cutter spindle 3 extends axially through the worm wheel 63 and has keyed thereto the detachable sleeve 79 which has a sliding fit in the elongated hub 80 of the worm wheel 63.

In generating worm wheels and worms by the method of the present invention, it is necessary that there be a relative movement of oscillation between the cutter and blank about the axis of one of the spindles in order to maintain proper intermeshing relation between the cutter and blank during the cutting stroke and to generate the teeth in the blank on the molding generating principle.

In order to provide this oscillatory movement in addition to and independently of the continuous movements of rotation imparted by the driving mechanism, helical grooves 81 are provided in the sleeve 79 and these grooves are engaged by gibs carried by the hub 80, each gib consisting of two side members 82 engaging opposite side walls of the helical groove and the intermediate wedge member 83 interposed between the members 82, serving to hold the members 82 in close engagement with the walls of the grooves. The side members 82 of the gibs are held in place by bolts 84 and the wedge 83 is adjustable radially by means of the adjusting screw 85.

As the cutter spindle is reciprocated axially, the engagement of the gibs in the helical grooves 81 imparts an oscillatory movement to the cutter spindle which is synchronous with the reciprocating movements thereof with the speed of angular movement in each direction at all times in a fixed ratio to the speed of axial movement. A number of interchangeable sleeves 79 may be provided having grooves of various helix angles in order to provide the oscillatory movements required for different worm wheels or worms.

Figure 6:
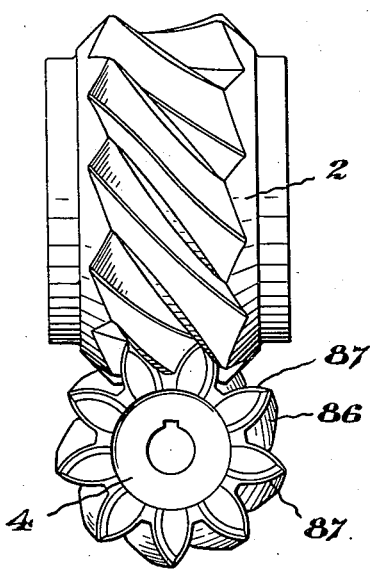
Fig. 6 is a front elevation showing the cutter in engagement with the worm wheel blank.
Figure 5:
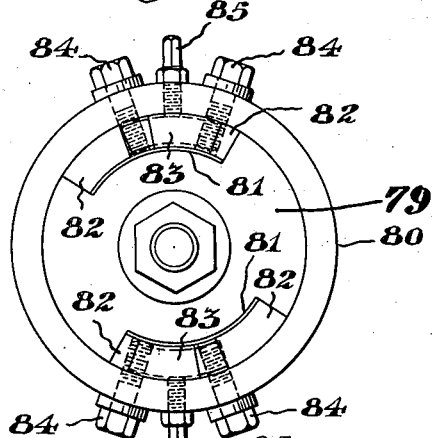
Fig. 5 is an end view showing the spline connection between the cutter spindle and its operating gear.
Figure 7:
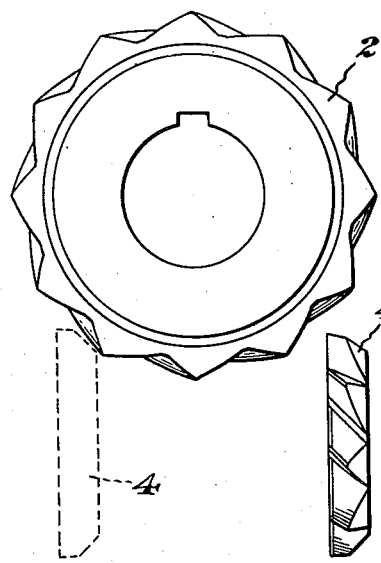
Fig. 7 is a side elevation of the cutter and blank showing the cutter in full lines at the rear end of its stroke.
Figure 8:
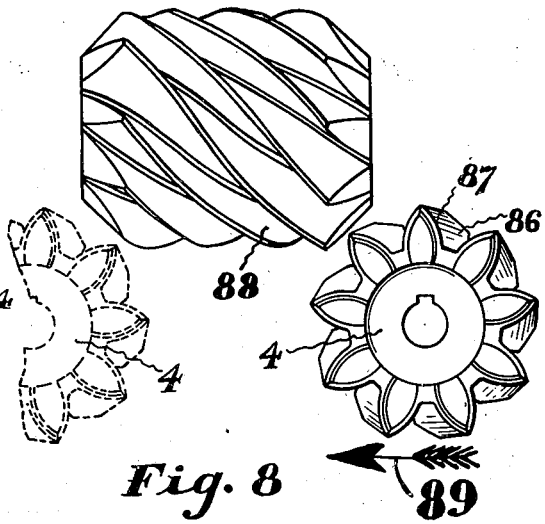
Fig. 8 is a side elevation illustrating the method of generating worms with a helical gear shaper cutter, the cutter being shown in full lines at the start of the cutting action and in dotted lines at the end thereof.

As shown in Figs. 6, 7 and 8, the gear shaper cutter employed has helical teeth 86 which are provided at the front face of the cutter with cutting edges 87 which are preferably so formed as to lie in planes perpendicular to the axis of the cutter, the cutter being preferably of the type disclosed in my copending application Serial No. 428,846, filed February 15, 1930 issued June 16, 1931 as Patent No. 1,809,869.

In cutting worm wheels by the method of the present invention, the worm wheel blank is mounted upon the work spindle 1 directly over the axis of the cutter spindle, the work spindle being adjusted vertically by any suitable means such as the screw 36, see Fig. 2, to position the blank, with respect to the cutter to obtain proper depth of tooth in the work.

As is the usual practice in making gear shaper cutters, the teeth of the cutter are provided with a slight longitudinal taper, one side face of each tooth having a helix angle slightly greater than the helix angle of the corresponding worm and the other side face having a helix angle slightly less than the corresponding helix angle of the worm tooth face.

Assuming the worm wheel 63 to be stationary and the cutter spindle to be reciprocating, it will be apparent that the helical grooves 81 will cause the cutter spindle to turn through a predetermined angle per unit of length of its axial movement and that each of the cutting edges during the forward stroke of the cutter will generate a helicoid surface identical with the helicoid surface of a worm.

By providing the grooves 81 in the sleeve 79 which have a longitudinal lead equal to the lead of the worm with which the worm wheel to be generated is intended to mesh, the cutting edges 87 of the cutter 4 will be caused to generate helicoid surfaces identical with the tooth surfaces of the worm during the axial movements of the cutter.

If a continuous movement of rotation be imparted to the worm gear 63, it is apparent that these rotary movements will be superimposed upon the oscillatory movements of the spindle and that the actual speed of rotation of the spindle at any instant is the algebraic sum of the angular speed of the gear and the angular speed of oscillation imparted to the spindle by its axial movement through the helical spline. The continuous rotary movement, together with the independent oscillatory movement of the spindle causes the cutting edges 87 to remain in imaginary helicoid surfaces identical with the tooth surfaces of the worm conjugate to the worm wheel being generated with the imaginary helicoid surfaces rotating about the axis of the cutter at the speed of rotation of the worm wheel 63.

By correlating the reciprocating, oscillating and rotational movements of the spindle, as above described, the gear shaper cutter is caused to have a molding generating action on the blank corresponding to that of the worm conjugate to the worm wheel gear to be generated. In other words, the cutter will generate a worm wheel of a form identical with that which would be molded by the worm conjugate to the worm wheel, if the worm were engaged with a worm wheel cylinder of soft compressible material, the worm and worm wheel cylinder rotating at a speed ratio corresponding to that of the cutter and worm wheel above referred to.

The rotation of the cutter and work blank may be continuous throughout the entire operation in which case the cutter may be fed to the proper depth of tooth desired during which feed movement the cutter gradually widens and deepens the grooves in the blank, after which the other movements are continued until all of the teeth in the work blank have been generated.

If desired, the cutter may be fed to full depth in the blank before the rotation of the cutter and blank is started, in which case the cutter engages the blank only on the under side thereof and generates grooves corresponding to those which would be formed by pressing the worm with which the worm gear is designed to mesh into a cylinder of soft compressible material. After the cutter has been fed to depth, the rotation of the cuttter and blank may be started, the rotation in this case being a very slow rotation and the cutter spindle making a large number of cutting strokes in each tooth space. By this method, each of the grooves of the worm wheel is cut to full depth and the complete worm wheel may be generated in one revolution of the blank.

It will be apparent that the method of the present invention can be used either to completely cut a worm wheel or may be used to finish a worm wheel in which the teeth have previously been cut, and that in either case, the cutter and blank may be rotated continuously during the entire operation, or the rotation may start after the cutter has been fed to depth.

Worms of any desired helix angle and any desired number of teeth may also be generated by the method of the present invention. To generate a worm, the worm blank is mounted upon the work spindle 1 and the cutter, which may be a helical gear shaper cutter of the type employed for cutting worm wheel gears and preferably is the same cutter used in cutting the worm wheel gear, is mounted upon the cutter spindle 3. The sleeve 79 is employed which has the helical groove 81 of the same longitudinal lead as the threads of the worm to be generated.

The cutter has the form of a helical gear adapted to mesh with a worm with its axis at right angles thereto and is disposed with its face substantially in an axial plane of the worm, or at a slight angle thereto as is often found necessary in practice.

The gear ratio between the work and cutter spindles corresponds to the tooth ratio between the worm and cutter, as heretofore described so that the worm and cutter are adapted to rotate in intermeshing engagement.

The axial reciprocation of the cutter toward and away from the observer, see Fig. 8, together with its oscillating movement, takes place simultaneously with the slow rotary movement of the cutter and work blank, and simultaneously the cutter is caused to move slowly in the direction of the arrow 89 across the face of the worm or helical gear 88. The movements referred to cause the cutter teeth 86 to move in helical paths relative to the surface of the blank and to generate the worm teeth throughout the entire circumferential surface and cylindrical length of the worm blank, as the cutter moves slowly, tangentially and longitudinally of the work 88 from the position of the cutter shown in full lines to the position of the cutter shown in dotted lines, the longitudinal movement of the cutter referred to being as described in the direction of the arrow 89.

The method of cutting worms and/or helical gears, using a helical cutter, forms the subject matter of my copending application, Serial No. 234,788, filed November 21, 1927, issued June 23, 1931 as Patent No. 1,811,568.

It will be apparent, also, that the present invention may be employed to cut worms from cylindrical blanks or may be employed to finish worms which have been cut by other methods on other machines.

What I claim is:

1. The herein described method of generating worm gearing which comprises supporting a blank and a gear shaped cutter with their axes spaced apart and crossing at an angle corresponding to that of the axis of the worm wheel with respect to the axis of a conjugate worm in mesh therewith, causing a relative reciprocating movement of the cutter and blank, one with respect to the other to cause the cutter to traverse the face of the blank and simultaneously causing a relative oscillating movement of the cutter and blank, one with respect to the other angularly about one of said axes, maintaining the speed of angular movement at a fixed ratio to the speed of axial movement in both directions of axial and angular movement, gradually moving the axes of the cutter and blank closer together to feed the cutter into the blank, and imparting to the cutter and blank continuous relative movements of rotation about their axes in addition to said axial and oscillatory movements, at a speed ratio corresponding to the tooth ratio between the worm wheel and its worm.

2. The herein described method of generating a worm wheel on the molding generating principle with a gear shaped cutter having teeth with cutting edges which conform to the tooth surfaces of the worm with which the worm wheel is intended to mesh, which comprises positioning the cutter with its axis in a position with respect to the blank corresponding to that of the worm in mesh with the worm wheel, reciprocating the cutter axially across the face of the blank and simultaneously oscillating the cutter angularly about its axis at angular speeds so correlated to the speeds of axial movement as to cause the cutting edges to travel, during axial movement of the cutter, in helicoid surfaces corresponding to the tooth faces of the worm with which the worm wheel is intended to mesh, imparting a continuous movement of rotation to the cutter in addition to its oscillating and reciprocating movements, and rotating the blank at the speed at which the worm wheel would be driven by its worm rotating at the rate of continuous rotation of the cutter.

3. The herein described method of generating worm wheels which comprises supporting a gear blank and a gear shaped cutter with their axes spaced apart and crossing at an angle corresponding to that at which the axis of the worm wheel to be generated is intended to cross the axis of its conjugate worm, reciprocating the cutter axially across the face of the blank and simultaneously oscillating the cutter angularly about its axis, moving the same during the forward stroke of the cutter at an angular speed in one direction at all times in a predetermined ratio to its speed of axial movement and angularly in the reverse direction during the return stroke, gradually moving the axes of the cutter and blank closer together to feed the cutter into the blank, imparting a continuous movement of rotation to the cutter in addition to its oscillating movement, and imparting a continuous movement of rotation to the blank corresponding to that which would be imparted to the worm wheel being generated by its conjugate worm rotating at the speed of continuous rotation of the cutter.

4. The herein described method of generating worms which consists in positioning a gear shaped cutter and worm blank with their axes spaced and crossing substantially at right angles and with the face of the cutter substantially in an axial plane with respect to the blank, causing a relative reciprocating motion between the cutter and blank axially of the cutter and simultaneously causing a relative oscillating movement about the axis of the cutter with an angular speed in each direction which has a predetermined ratio to the speed of axial movement, causing a relative movement of the cutter longitudinally of the blank, and imparting a continuous movement of rotation to the cutter and to the blank about their respective axes in addition to said relative oscillating movement and at a speed ratio corresponding to the ratio between the number of teeth of the worm and the number of teeth of the cutter.

5. The herein described method of generating worms which consists in positioning a gear shaped cutter and worm blank with their axes spaced and crossing substantially at right angles and with the face of the cutter substantially in an axial plane with respect to the blank, reciprocating the cutter axially and simultaneously oscillating the cutter with an angular speed in each direction which has a predetermined ratio to the speed of axial movement, moving one of said axes toward the other in the direction of the common normal to feed the cutter into the blank, causing a relative movement of the cutter longitudinally of the blank, imparting a continuous movement of rotation to the cutter in addition to its oscillatory and reciprocating movements, rotating the blank at a speed which has a fixed ratio to the speed of continuous rotation of the cutter corresponding to the ratio between the number of teeth or threads in the worm to be generated and the number of teeth of the cutter.

OLIVER G. SIMMONS.